United States Patent
Yashiki et al.

(10) Patent No.: US 11,377,705 B2
(45) Date of Patent: Jul. 5, 2022

(54) GRAIN-ORIENTED ELECTRICAL STEEL SHEET

(71) Applicant: NIPPON STEEL CORPORATION, Tokyo (JP)

(72) Inventors: Hiroyoshi Yashiki, Kobe (JP); Kenichi Murakami, Kitakyushu (JP); Nobusato Morishige, Kobe (JP); Hirotoshi Tada, Himeji (JP); Yoshiaki Natori, Himeji (JP)

(73) Assignee: NIPPON STEEL CORPORATION, Tokyo (JP)

( * ) Notice: Subject to any disclaimer, the term of this patent is extended or adjusted under 35 U.S.C. 154(b) by 185 days.

(21) Appl. No.: 16/793,670

(22) Filed: Feb. 18, 2020

(65) Prior Publication Data

US 2020/0181725 A1 Jun. 11, 2020

Related U.S. Application Data

(62) Division of application No. 15/502,682, filed as application No. PCT/JP2015/072896 on Aug. 13, 2015, now Pat. No. 10,604,818.

(30) Foreign Application Priority Data

Sep. 1, 2014 (JP) .................................. 2014-177136

(51) Int. Cl.
*C21D 8/12* (2006.01)
*C21D 9/46* (2006.01)
(Continued)

(52) U.S. Cl.
CPC .......... *C21D 8/1222* (2013.01); *B22D 11/001* (2013.01); *B32B 15/04* (2013.01);
(Continued)

(58) Field of Classification Search
None
See application file for complete search history.

(56) References Cited

U.S. PATENT DOCUMENTS 4,898,626 A 2/1990 Shoen et al.
2003/0062147 A1 4/2003 Schoen et al.
(Continued)

FOREIGN PATENT DOCUMENTS

CN 1263872 C 7/2006
EP 0 959 142 A2 11/1999
(Continued)

OTHER PUBLICATIONS

Machine translation of JP06-017201A. (Year: 1994).*
(Continued)

*Primary Examiner* — Xiaowei Su
(74) *Attorney, Agent, or Firm* — Birch, Stewart, Kolasch & Birch, LLP

(57) ABSTRACT

A grain-oriented electrical steel sheet includes a steel layer and an insulation coating arranged in directly contact with the steel layer thereon. The steel layer includes, as a chemical composition, by mass %, 2.9 to 4.0% of Si, 2.0 to 4.0% of Mn, 0 to 0.20% of Sn, and 0 to 0.20% of Sb. In the steel layer, a silicon content and a manganese content expressed in mass % satisfy $1.2\% \leq Si-0.5 \times Mn \leq 2.0\%$, and a tin content and an antimony content expressed in mass % satisfy $0.005\% \leq Sn+Sb \leq 0.20\%$.

5 Claims, 1 Drawing Sheet

(51) Int. Cl.
*H01F 1/16* (2006.01)
*C22C 38/60* (2006.01)
*C22C 38/00* (2006.01)
*B32B 15/18* (2006.01)
*B32B 15/04* (2006.01)
*B22D 11/00* (2006.01)
*C22C 38/02* (2006.01)
*C22C 38/04* (2006.01)
*C22C 38/06* (2006.01)

(52) U.S. Cl.
CPC ............... *B32B 15/18* (2013.01); *C21D 8/12* (2013.01); *C21D 8/1233* (2013.01); *C21D 8/1272* (2013.01); *C21D 8/1283* (2013.01); *C21D 9/46* (2013.01); *C22C 38/00* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/60* (2013.01); *H01F 1/16* (2013.01); *B32B 2255/06* (2013.01); *B32B 2255/26* (2013.01); *B32B 2307/206* (2013.01); *B32B 2307/208* (2013.01); *B32B 2307/732* (2013.01); *C21D 2201/05* (2013.01)

(56) References Cited

U.S. PATENT DOCUMENTS

| | | |
|---|---|---|
| 2003/0116236 A1 | 6/2003 | Hayakawa et al. |
| 2008/0216985 A1 | 9/2008 | Gunther et al. |
| 2009/0044881 A1 | 2/2009 | Kumano et al. |
| 2012/0222777 A1 | 9/2012 | Fortunati et al. |
| 2013/0129985 A1 | 5/2013 | Inoue et al. |
| 2015/0211089 A1 | 7/2015 | Fukunaga et al. |
| 2016/0260531 A1* | 9/2016 | Terashima .............. C22C 38/00 |

FOREIGN PATENT DOCUMENTS

| | | | |
|---|---|---|---|
| EP | 1273673 | A1 | 1/2003 |
| EP | 1279747 | A2 | 1/2003 |
| EP | 2540844 | A1 | 1/2013 |
| EP | 2 775 007 | A1 | 9/2014 |
| JP | 1-290716 | A | 11/1989 |
| JP | 6-17201 | A | 1/1994 |
| JP | 6-184707 | A | 7/1994 |
| JP | 7-18334 | A | 1/1995 |
| JP | 8-134542 | A | 5/1996 |
| JP | 11-350032 | A | 12/1999 |
| JP | 2002-294345 | A | 10/2002 |
| JP | 2007-302999 | A | 11/2007 |
| JP | 2014-47411 | A | 3/2014 |
| RU | 2290448 | C2 | 12/2006 |
| RU | 2363739 | C1 | 8/2009 |
| RU | 2407807 | C2 | 12/2010 |
| RU | 2524026 | C1 | 7/2014 |

OTHER PUBLICATIONS

Final Office Action issued in U.S. Appl. No. 15/502,682, dated Aug. 7, 2019.
Non-Final Office Action issued in U.S. Appl. No. 15/502,682, dated Apr. 11, 2019.
Notice of Allowance issued in U.S. Appl. No. 15/502,682, dated Nov. 18, 2019.
Restriction/Election Requirement issued in U.S. Appl. No. 15/502,682, dated Jan. 24, 2019.
Chinese Office Action and Search Report dated Dec. 26, 2017 for corresponding Chinese Application No. 201580045579.6, with English translation of the Search Report.
Extended European Search Report for counterpart Application No. 15838897.5, dated Feb. 28, 2018.
Indian Office Action issued in Indian Patent Application No. 201717004560, dated Feb. 5, 2020.
International Search Report for PCT/JP2015/072896 dated Nov. 17, 2015.
JP06017201 English machine translation.
JP06184707 English machine translation.
JP2002294345 English machine translation.
Russian Notice of Allowance and Search Report, dated May 24, 2018, for corresponding Russian Application No. 2017105816, with English translations.
Written Opinion of the International Searching Authority for PCT/JP2015/072896 (PCT/ISA/237) dated Nov. 17, 2015.

* cited by examiner

GRAIN-ORIENTED ELECTRICAL STEEL SHEET

CROSS-REFERENCE TO RELATED APPLICATIONS

This application is a Divisional of copending U.S. application Ser. No. 15/502,682, filed on Feb. 8, 2017, which is the National Phase under 35 U.S.C. § 371 of International Application No. PCT/JP2015/072896, filed on Aug. 13, 2015, which claims the benefit under 35 U.S.C. § 119(a) to Patent Application No. 2014-177136, filed in Japan on Sep. 1, 2014, all of which are hereby expressly incorporated by reference into the present application.

TECHNICAL FIELD

The present invention relates to a grain-oriented electrical steel sheet suitable for the segment core of rotating machines such as motor or generator, the lamination core of stationary apparatus such as transformer or reactor, or the like. In particular, the present invention relates to a grain-oriented electrical steel sheet in which the high-frequency magnetic properties along L-direction are almost the same as those of conventional one and the high-frequency magnetic properties along C-direction are preferably improved.

Priority is claimed on Japanese Patent Application No. 2014-177136, filed Sep. 1, 2014, the content of which is incorporated herein by reference.

BACKGROUND ART

The grain-oriented electrical steel sheet has the excellent magnetic properties along rolling direction, because the crystal orientation thereof highly aligns in the {110}<001> orientation called Goss orientation. Thus, the grain-oriented electrical steel sheet has been widely applied to the iron core materials such as transformer, generator, or motor. In recent years, since power electronics have developed, the high-frequency range over conventional commercial frequency range has been increasingly utilized as the drive frequency for the rotating machines such as motor or generator, the stationary apparatus such as transformer or reactor, or the like. Thus, it is eagerly anticipated to further improve the core loss characteristics in high-frequency range for the grain-oriented electrical steel sheet.

In addition, in case of using the drive motor which employs the segment core for hybrid vehicles (HEV), electric vehicles (EV), or the like, the excellent core loss characteristics in high-frequency range are desired in both directions of teeth and back yoke of the iron core. Thus, in addition to the core loss characteristics along the rolling direction (L-direction) in high-frequency range, it is eagerly anticipated to further improve the core loss characteristics along the transverse direction (C-direction) perpendicular to the rolling direction in high-frequency range for the grain-oriented electrical steel sheet. Specifically, in the grain-oriented electrical steel sheet, in addition to the high-frequency core loss along L-direction (L-direction core loss), it is required to be excellent in the average of the high-frequency core losses along L-direction and C-direction (L&C average core loss).

Herein, the segment core indicates the component included in the stator arranged on the periphery of rotor of motor. The segment core is punched from the grain-oriented electrical steel sheet so that the radial direction of motor rotational axis is substantially parallel to the rolling direction (L-direction) of the electrical steel sheet, and the circumferential direction of motor rotational axis is substantially parallel to the direction (C-direction) perpendicular to the rolling direction of the electrical steel sheet. Specifically, in the segment core, the teeth which is important for magnetic properties in general is substantially parallel to the rolling direction of the electrical steel sheet, and the back yoke is substantially parallel to the direction perpendicular to the rolling direction. In case of the stator in which the back yoke is important for magnetic properties, the segment core may be punched so that the back yoke is substantially parallel to the rolling direction of the electrical steel sheet.

Also, the core loss indicates the energy loss caused by the interconversion of electrical energy and magnetic energy. It is preferable that the value of core loss is low. The core loss of the grain-oriented electrical steel sheet is able to be broken down into two elements of hysteresis loss and eddy current loss. In particular, in order to reduce the high-frequency core loss, it is effective to reduce the eddy current loss by controlling the steel to be highly alloyed and by increasing the electrical resistance of steel. Although it is possible to reduce the eddy current loss by controlling the electrical steel sheet to be thin, it is inevitable to increase the production cost in order to control the electrical steel sheet to be thin due to a decrease in efficiency of cold rolling, annealing, or the like.

In conventional grain-oriented electrical steel sheets, the magnetic anisotropy is obtained by the texture control, and thereby, the magnetic properties along the L-direction are significantly excellent. However, the magnetic properties along the C-direction thereof are markedly insufficient. Thus, it is unsuitable to apply the conventional grain-oriented electrical steel sheet to the segment core in which it is required to be balance the L&C average core loss with the L-direction core loss.

In addition, as explained above, in order to reduce the high-frequency core loss, it is effective to control the steel to be highly alloyed. However, when Si which is the main alloying element of the electrical steel sheet is added in surplus as compared with that of conventional one, the steel embrittles, and thereby, the cold rolling is hardly conducted. Also, Al is the alloying element which may not embrittle the steel as compared with Si. However, when Al is added in surplus to the steel, it is difficult to control the dispersion state of the inhibitor AlN which importantly functions for controlling the crystal orientation in secondary recrystallization.

Patent Document 1 discloses the method for producing the electrical steel sheet excellent in the balance between the magnetic properties in L-direction and C-direction. In the method thereof, the steel slab including 2.0 to 4.0% of Si, 0.5% or less of Mn, 0.003 to 0.020% of sol. Al, or the like is subjected to hot-rolling, hot-band annealing, cold-rolling twice with intermediate annealing, primary recrystallization annealing, and secondary recrystallization annealing.

Patent Document 2 discloses the method for producing the electrical steel sheet excellent in the balance between the magnetic properties in L-direction and C-direction. In the method thereof, the steel slab including 2.5 to 4.0% of Si, 2.0 to 4.0% of Mn, 0.003 to 0.030% of acid-soluble Al, or the like is subjected to hot-rolling, optionally hot-band annealing, cold-rolling, primary recrystallization annealing, and secondary recrystallization annealing.

RELATED ART DOCUMENTS

Patent Documents

[Patent Document 1] Japanese Unexamined Patent Application, First Publication No. H11-350032
[Patent Document 2] Japanese Unexamined Patent Application, First Publication No. H07-18334

SUMMARY OF INVENTION

Technical Problem to be Solved

In the electrical steel sheet produced by the method disclosed in Patent Document 1, the amount of alloying elements is insufficient, and therefore, the high-frequency core loss is not sufficiently reduced.

In the electrical steel sheet according to Patent Document 2, Patent Document 2 only considers the core loss in commercial frequency range of 50 to 60 Hz, and therefore, the high-frequency core loss is not sufficiently reduced. Also, in the producing method according to Patent Document 2, the secondary recrystallization tends to be unstable, and therefore, the electrical steel sheet is not stably produced.

The present invention has been made in consideration of the above mentioned problems. An object of the present invention is to provide the grain-oriented electrical steel sheet excellent in both the high-frequency magnetic properties in L-direction and the average of high-frequency magnetic properties in L-direction and C-direction.

Solution to Problem

The present inventors found that, by including a large amount of Mn which is difficult to embrittle the steel in common with Al depending on Si content in the steel, by controlling a total amount of Sn and Sb in the steel, and by optimally controlling the production conditions, it is possible to obtain the electrical steel sheet in which the high-frequency magnetic properties along L-direction are almost the same as those of conventional one and the high-frequency magnetic properties along C-direction are preferably improved.

In the grain-oriented electrical steel sheet according to an aspect of the present invention, the thickness of sheet is 0.1 to 0.40 mm, and the magnetic flux density B8 along the rolling direction is 1.60 to 1.77 T. When the magnetic flux density B8 along the rolling direction is 1.60 to 1.77 T, the balance between the L-direction core loss and the L&C average core loss is preferably controlled. The present inventors found that, when the magnetic flux density B8 along the rolling direction is less than 1.60 T, the L-direction core loss is insufficient. Also, the present inventors found that, when the magnetic flux density B8 along the rolling direction is more than 1.77 T, the L-direction core loss is sufficient, however the C-direction core loss deteriorates, and as a result, the L&C average core loss drastically deteriorates.

An aspect of the present invention employs the following.

(1) A grain-oriented electrical steel sheet according to an aspect of the present invention includes a steel layer and an insulation coating arranged on the steel layer, wherein: the steel layer includes, as a chemical composition, by mass %, 0.0003 to 0.005% of C, 2.9 to 4.0% of Si, 2.0 to 4.0% of Mn, 0.003 to 0.018% of sol. Al, 0.005% or less of S, 0 to 0.20% of Sn, 0 to 0.20% of Sb, and a balance consisting of Fe and impurities; a silicon content and a manganese content expressed in mass % in the chemical composition of the steel layer satisfy 1.2%≤Si−0.5×Mn≤2.0%; a tin content and an antimony content expressed in mass % in the chemical composition of the steel layer satisfy 0.005%≤Sn+Sb≤0.20%; and the insulation coating is arranged in directly contact with the steel layer.

(2) In the grain-oriented electrical steel sheet according to (1), the steel layer may include, as the chemical composition, by mass %, 0.004 to 0.20% of Sn, and 0.001 to 0.20% of Sb.

(3) A method of producing the grain-oriented electrical steel sheet according to (1) or (2) includes a casting process, a hot-rolling process, a cold-rolling process, a primary recrystallization annealing process, an annealing separator coating process, a secondary recrystallization annealing process, and an insulation coating formation process, wherein: in the casting process, a steel is cast so that the steel includes, as a chemical composition, by mass %, 0.0003 to 0.005% of C, 2.9 to 4.0% of Si, 2.0 to 4.0% of Mn, 0.003 to 0.018% of sol. Al, 0.001 to 0.01% of N, 0.005% or less of S, 0 to 0.20% of Sn, 0 to 0.20% of Sb, and a balance consisting of Fe and impurities, a silicon content and a manganese content expressed in mass % in the chemical composition satisfy 1.2%≤Si−0.5×Mn≤2.0%, and a tin content and an antimony content expressed in mass % in the chemical composition satisfy 0.005%≤Sn+Sb≤0.20%; in the primary recrystallization annealing process, a primary recrystallization annealing is conducted for the steel under conditions such that a heating rate in a temperature elevating stage is 100° C./second to 5000° C./second on average, an atmosphere in the temperature elevating stage is 10 to 100 vol % of H2 and H2+N2=100 vol %, a temperature in a holding stage is 800 to 1000° C., a time in the holding stage is 5 seconds to 10 minutes, an atmosphere in the holding stage is 10 to 100 vol % of H2, H2+N2=100 vol %, and a dew point is −10° C. or lower; in the annealing separator coating process, an annealing separator including an alumina as a main component is only applied on the steel; and in the secondary recrystallization annealing process, a secondary recrystallization annealing is conducted for the steel under conditions such that an atmosphere in a temperature elevating stage is 0 to 80 vol % of N2 and H2 +N2=100 vol %, a dew point in a temperature range of 500° C. or higher in the temperature elevating stage is 0° C. or lower, a temperature in a holding stage is 850 to 1000° C., a time in the holding stage is 4 to 100 hours, an atmosphere in the holding stage is 0 to 80 vol % of N2, H2+N2=100 vol %, and a dew point is 0° C. or lower.

(4) In the method of producing the grain-oriented electrical steel sheet according to (3), in the casting process, the steel may include, as the chemical composition, by mass %, 0.004 to 0.20% of Sn, and 0.001 to 0.20% of Sb.

(5) In the method of producing the grain-oriented electrical steel sheet according to (3) or (4), in the secondary recrystallization annealing process, the steel is heated to the temperature in the holding stage by a constant heating rate in the temperature elevating stage.

Effects of Invention

According to the above aspects of the present invention, it is possible to provide the grain-oriented electrical steel sheet excellent in both the high-frequency magnetic properties in L-direction and the average of high-frequency magnetic properties in L-direction and C-direction.

DETAILED DESCRIPTION OF PREFERRED EMBODIMENTS

Hereinafter, a preferable embodiment of the present invention will be described in detail. However, the present invention is not limited only to the configuration which is disclosed in the embodiment, and various modifications are possible without departing from the aspect of the present invention. In addition, the limitation range as described below includes a lower limit and an upper limit thereof. However, the value expressed by "more than" or "less than" is not include in the limitation range.

Hereinafter, the grain-oriented electrical steel sheet according to the embodiment will be described in detail.

The present inventors thoroughly review the chemical composition of the steel and the production conditions, and thereby, succeed in obtaining the grain-oriented electrical steel sheet excellent in the balance between the high-frequency core losses in L-direction and C-direction.

The grain-oriented electrical steel sheet according to the embodiment includes a steel layer (base steel) and an insulation coating arranged on the steel layer, wherein: the steel layer includes, as a chemical composition, by mass %, 0.0003 to 0.005% of C, 2.9 to 4.0% of Si, 2.0 to 4.0% of Mn, 0.003 to 0.018% of sol. Al, 0.005% or less of S, 0 to 0.20% of Sn, 0 to 0.20% of Sb, and a balance consisting of Fe and impurities; a silicon content and a manganese content expressed in mass % in the chemical composition of the steel layer satisfy 1.2%≤Si−0.5×Mn≤2.0%; a tin content and an antimony content expressed in mass % in the chemical composition of the steel layer satisfy 0.005%≤Sn+Sb≤0.20%; and the insulation coating is arranged in directly contact with the steel layer. In addition, it is preferable that the thickness of the grain-oriented electrical steel sheet is 0.1 to 0.40 mm and the magnetic flux density B8 along the rolling direction of the grain-oriented electrical steel sheet is 1.60 to 1.77 T.

Figure 1:
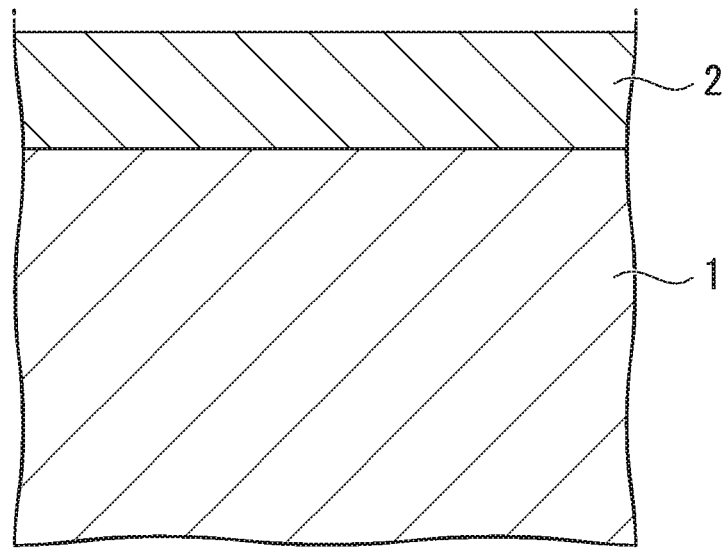
FIG. 1 is a cross-sectional illustration of a grain-oriented electrical steel sheet according to an embodiment of the present invention.
Figure 2:
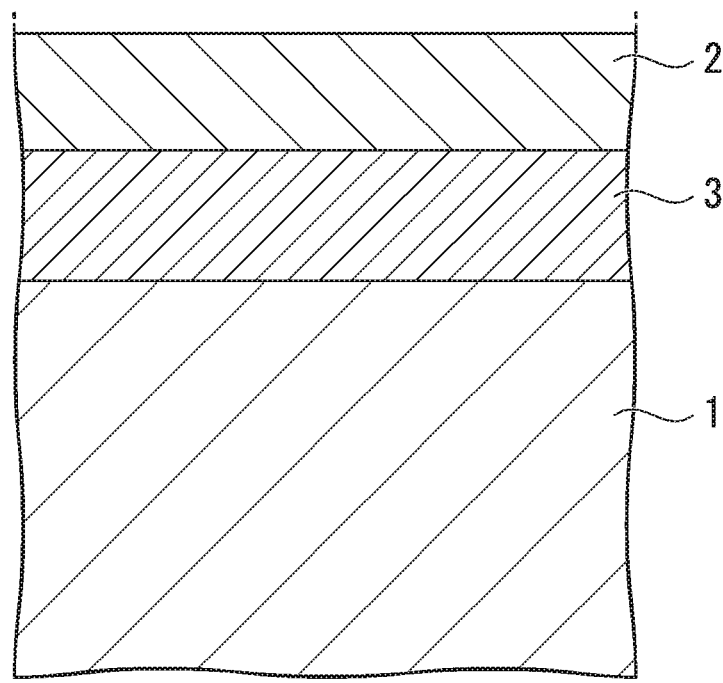
FIG. 2 is a cross-sectional illustration of a conventional grain-oriented electrical steel sheet.

FIG. 1 shows the grain-oriented electrical steel sheet according to the embodiment in case of viewing the cross section whose cutting direction is parallel to the thickness direction. In the grain-oriented electrical steel sheet according to the embodiment, the insulation coating 2 is arranged in directly contact with the steel layer 1 (base steel). FIG. 2 shows the conventional grain-oriented electrical steel sheet in case of viewing the cross section whose cutting direction is parallel to the thickness direction. In the conventional grain-oriented electrical steel sheet, the glass film 3 (forsterite film) is arranged on the steel layer 1 (base steel), and the insulation coating 2 is arranged on the glass film 3 (forsterite film).

(1) Chemical Composition of Steel Layer (Base Steel)

The chemical composition of steel layer of the grain-oriented electrical steel sheet according to the embodiment will be described in detail. Hereinafter, "%" of the amount of respective elements as described below expresses "mass %" unless otherwise mentioned.

In the chemical composition of steel layer of the grain-oriented electrical steel sheet according to the embodiment, base elements are C, Si, Mn, and Al.

C: 0.0003 to 0.005%

C (carbon) is the base element in the steel but the element which causes the deterioration of core loss. Thus, it is preferable that C content is as small as possible. In the grain-oriented electrical steel sheet according to the embodiment, the upper limit of C content is to be 0.005%. When the C content is more than 0.005%, the core loss of the grain-oriented electrical steel sheet deteriorates, and thus, the excellent magnetic properties are not obtained. The upper limit of C content is preferably 0.004% and more preferably 0.003%. On the other hand, although the lower limit of C content is not particularly limited, the lower limit is to be 0.0003%. Since the production cost for steel making is excessive, it is industrially difficult to control the C content to be less than 0.0003%.

Si: 2.9 to 4.0%

Si (silicon) has the effect in increasing the electrical resistance of steel, reducing the eddy current loss, and thereby, improving the high-frequency core loss. In order to effectively obtain the effect, the lower limit of Si content is to be 2.9%. The lower limit of Si content is preferably 3.0%. On the other hand, the upper limit of Si content is to be 4.0%. When the Si content is more than 4.0%, the workability drastically deteriorates, and thus, it is difficult to conduct the cold-rolling. The upper limit of Si content is preferably 3.8%.

Mn: 2.0 to 4.0%

Mn (manganese) has the effect in increasing the electrical resistance of steel without the deterioration of the workability of steel, reducing the eddy current loss, and thereby, improving the high-frequency core loss. In order to effectively obtain the effect, the lower limit of Mn content is to be 2.0%. When the Mn content is less than 2.0%. The effect in reducing the high-frequency core loss is insufficient. The lower limit of Mn content is preferably 2.2% and more preferably 2.6%. On the other hand, the upper limit of Mn content is to be 4.0%. When the Mn content is more than 4.0%, the magnetic flux density drastically decreases. The upper limit of Mn content is preferably 3.8% and more preferably 3.4%.

Si−0.5×Mn: 1.2 to 2.0%

In addition, in the embodiment, the Si content and the Mn content are regulated in connection with each other. In order to let the secondary recrystallization proceed stably, it is necessary to control the microstructure of hot-rolled steel sheet to be uniform and fine. Therefore, in the embodiment, the transformation between α (ferrite) and γ (austenite) is utilized. In the conventional grain-oriented electrical steel sheet, C which is an austenite-forming element is contained at the stage of the hot-rolled steel sheet. However, in the electrical steel sheet according to the embodiment, the C content is low at the stage of the hot-rolled steel sheet. Thus, in the electrical steel sheet according to the embodiment, the α-γ transformation is mainly affected by the balance between the amount of Si which is a ferrite-forming element and the amount of Mn which is an austenite-forming element. It is necessary to regulate the Si content and the Mn content in connection with each other.

Specifically, the upper limit of the value calculated by "(Si content)−0.5×(Mn content)" is to be 2.0%. When the value is more than 2.0%, the α-γ transformation does not occur sufficiently, the microstructure of hot-rolled steel sheet is not controlled to be uniform and fine, and the secondary recrystallization becomes unstable. The upper limit of "Si−0.5×

Mn" is preferably 1.8% and more preferably 1.75%. On the other hand, although the lower limit of "Si−0.5×Mn" is not particularly limited, the lower limit is to be 1.2%. In order to let the secondary recrystallization proceed stably, the lower limit of "Si−0.5×Mn" is preferably 1.6%. When the Si content and the Mn content satisfy the above condition, it is possible to obtain the grain-oriented electrical steel sheet excellent in the balance between the high-frequency core losses in L-direction and C-direction.

sol. Al: 0.003 to 0.018%

Sol. Al (acid-soluble aluminum) forms the inhibitor which importantly functions for controlling the crystal orientation in secondary recrystallization. The inhibitor is the nitrides as the precipitates, for example, the (Al, Si, Mn) composite nitrides. In the embodiment, the lower limit of sol. Al content is to be 0.003%. When the sol. Al content is less than 0.003%, the inhibitor's effect is not sufficiently obtained. On the other hand, the upper limit of sol. Al content is to be 0.018%. When the sol. Al content is more than 0.018%, the dispersion state of the nitrides is unfavorable, and thus, the secondary recrystallization does not proceed stably. The upper limit of sol. Al content is preferably 0.016%.

The steel layer of the grain-oriented electrical steel sheet according to the embodiment includes, as the chemical composition, the impurities. Herein, "impurities" represent elements which are contaminated during industrial production of the steel from ores and scrap that are used as a raw material of the steel, or from environment of a production process. Among the impurities, it is preferable that S is limited as follows in order to sufficiently obtain the effects of the embodiment. Moreover, since it is preferable that the amount of respective impurities is low, a lower limit does not need to be limited, and the lower limit of the respective impurities may be 0%.

S: 0.005% or less

S (sulfur) is the impurity. S forms MnS by bonding to Mn in the steel, and thus, the magnetic properties deteriorate. Therefore, the S content is limited to 0.005% or less. The upper limit of S content is preferably 0.004% and more preferably 0.003%.

The steel layer of the grain-oriented electrical steel sheet according to the embodiment includes the above mentioned base elements and the balance contains Fe and the above mentioned impurities. However, the steel layer of the grain-oriented electrical steel sheet according to the embodiment includes at least one of Sn or Sb in substitution for a part of Fe which is the balance.

Sn: 0 to 0.20%

Sb: 0 to 0.20%

Sn+Sb: 0.005 to 0.20%

Sn (tin) and Sb (antimony) are the elements which let the secondary recrystallization proceed stably and which let the high-frequency core loss be reduced by refining the secondary recrystallized grains. In order to obtain the effect, the Sn content is to be 0 to 0.20%, the Sb content is to be 0 to 0.20%, and the total amount of Sn and Sb is to be 0.005 to 0.20%. When one of Sn or Sb is contained in the steel layer, the other is not necessarily contained in the steel layer. Thus, the lower limit of each amount of Sn and Sb may be 0%. However, the lower limit of the total amount of Sn and Sb is to be 0.005%. The lower limit of the total amount of Sn and Sb is preferably 0.01%. On the other hand, the upper limit of the total amount of Sn and Sb is to be 0.20%. When the upper limit of the total amount of Sn and Sb is more than 0.20%, the above effect is saturated. The upper limit of the total amount of Sn and Sb is preferably 0.15% and more preferably 0.13%.

As described above, at least one of Sn or Sb may be included in the steel layer. However, it is preferable that both Sn and Sb are simultaneously included in the steel layer. For example, it is preferable that the lower limit of Sn content is 0.004% and the lower limit of Sb content is 0.001%. Specifically, it is preferable that the steel layer of the grain-oriented electrical steel sheet according to the embodiment includes Mn, Sn, and Sb at the same time. When the condition is satisfied, the average of the high-frequency core losses along L-direction and C-direction is preferably improved.

In the grain-oriented electrical steel sheet according to the embodiment, the Mn content and the Sn+Sb total content are simultaneously increased as the chemical composition of the steel layer. By increasing the Mn content, it is possible to increase the electrical resistance of steel, to reduce the eddy current loss, and as a result, to improve the average of the high-frequency magnetic properties (core losses) along L-direction and C-direction. Also, by increasing the Sn +Sb total content, it is possible to refine the secondary recrystallized grains, to reduce the excess eddy current loss, and as a result, to improve the average of the high-frequency magnetic properties (core losses) along L-direction and C-direction.

On the other hand, in the conventional grain-oriented electrical steel sheet, it is not necessarily easy to increase the Mn content and the Sn+Sb total content at the same time. In particular, when the Mn content is increased, it is not necessarily easy to include Sn and Sb at the same time. In the conventional grain-oriented electrical steel sheet, including Mn, Sn, and Sb at the same time causes the problem such that the adhesion of insulation coating drastically deteriorates. The present inventors assume that the above problem is derived from the excessive oxidation which occurs in the vicinity of the surface of steel layer during the primary recrystallization annealing and the secondary recrystallization annealing.

In the conventional grain-oriented electrical steel sheet, in general, the steel slab includes C whose content stabilizes the austenite at annealing temperature and hot rolling temperature, the heating for primary recrystallization annealing is conducted by heating rate of slower than 100° C./second, the primary recrystallization annealing is conducted in moist atmosphere (decarburizing atmosphere), the magnesia-based separator is used as an annealing separator, and the secondary recrystallization annealing is conducted. In the primary recrystallization annealing, since the atmosphere is moist (decarburizing atmosphere), the oxidation in addition to decarburization is promoted in the steel sheet (steel layer). Also, since MgO in the annealing separator which is slurried for applying to the steel sheet (steel layer) is changed to $Mg(OH)_2$, the magnesia annealing separator tends to oxidize the steel sheet (steel layer). Also, in the secondary recrystallization annealing, the magnesia annealing separator and the oxide layer (silica) at the surface of steel sheet (steel layer) are chemically reacted, and thus, the glass film (forsterite film) is formed.

In case of applying the above conventional producing method to the steel sheet (steel layer) where the Mn content and the Sn +Sb total content are simultaneously increased, the vicinity of the surface of steel layer may be excessively oxidized due to the peculiar chemical composition of steel. As a result, the problem such that the adhesion of insulation coating drastically deteriorates may occur. In the embodiment, by optimally controlling the chemical composition of steel layer and the production conditions, it is possible to increase the Mn content and the Sn +Sb total content at the same time. In particular, in addition to increasing the Mn content, it is possible to increase Sn and Sb at the same time. Although the detail of production conditions will be described below, in the embodiment, the C content in steel slab is controlled to be low, the rapid heating as compared with conventional heating is conducted in the temperature elevating stage of primary recrystallization annealing, the primary recrystallization annealing is conducted in dry atmosphere (non-decarburizing atmosphere), the alumina-based separator is used as the annealing separator, and the secondary recrystallization annealing is conducted in dry atmosphere.

The grain-oriented electrical steel sheet produced by the specific production conditions according to the embodiment does not include the glass film (forsterite film) on the steel layer, because the primary recrystallization annealing is conducted in dry atmosphere (non-decarburizing atmosphere), the alumina-based separator is used as the annealing separator, and the secondary recrystallization annealing is conducted in dry atmosphere. Specifically, in the grain-oriented electrical steel sheet according to the embodiment, the insulation coating is arranged in directly contact with the steel layer.

Even when the Mn content and the Sn +Sb total content are simultaneously increased in the steel layer, in particular, even when Sn and Sb are included at the same time in addition to increasing the Mn content, it is possible to suppress the excessive oxidation in the vicinity of the surface of steel layer by applying the specific production conditions according to the embodiment. Thus, it is possible to suppress the decrease in the adhesion of insulation coating. As a result, it is possible to preferably improve the average of the high-frequency magnetic properties (core losses) along L-direction and C-direction as compared with those of conventional one.

In addition, in the grain-oriented electrical steel sheet according to the embodiment, even when the Sn +Sb total content is increased in addition to increasing the Mn content, it is possible to preferably suppress the decrease in the punchability.

Sn and Sb are the elements which tend to embrittle the steel. With respect to the Si steel (steel layer) whose workability is essentially poor, when the Sn+Sb total content is increased in addition to excessively increasing the Mn content although Mn is difficult to embrittle the steel, the workability of steel may drastically deteriorate.

Although the details are unclear, when the Si steel (steel layer) includes the large amount of Mn, Mn oxides may be formed in addition to Si oxides in the vicinity of the surface of steel layer, Sn and Sb may be segregated in the vicinity of the Si oxides and the Mn oxides, and thereby, the punchability may deteriorate. Thus, in the conventional grain-oriented electrical steel sheet, it is not necessarily easy to increase the Mn content and the Sn+Sb total content at the same time. In particular, when the Mn content is increased, it is not necessarily easy to include Sn and Sb at the same time.

In the specific production conditions according to the embodiment, the oxidation of Mn is suppressed in the vicinity of the surface of steel layer during the primary recrystallization annealing, and the glass film is not formed during the secondary recrystallization annealing. Since the oxidation of Mn is suppressed and the glass film is not formed, the oxides are not excessive in the vicinity of the surface of steel layer. In particular, in addition to the specific production conditions according to the embodiment, when the steel simultaneously includes Sn and Sb and when the alumina-based separator is used as the annealing separator, the oxide layer further thins. Also, the segregation of Sn and Sb is suppressed. Therefore, the deterioration of punchability is preferably suppressed. The reason seems that the brittle fracture whose origin is in the vicinity of the surface (whose origin is in the interface between the steel layer and the insulation coating) is suppressed by thinning the oxide layer in the vicinity of the surface of the steel layer.

Specifically, in the steel layer of the grain-oriented electrical steel sheet according to the embodiment (the whole steel layer without the insulation coating), the amount of O (oxygen) is preferably 0.03% (300 ppm) or less in mass %. Also, when the surface area of steel layer is the area within 10 μm in depth toward the steel layer from the interface between the steel layer and the insulation coating, the O content is preferably less than 0.01% (100 ppm) in mass % in the body area which is the area except for the surface area in the steel layer. When the O content in the whole steel layer is 0.03% (300 ppm) or less, the deterioration of punchability is preferably suppressed. The O content in the whole steel layer is preferably 0.02% (200 ppm) or less and more preferably 0.01% (100 ppm) or less. In addition, although the lower limit of O content in the whole steel layer is not particularly limited, the lower limit may be 0.001% (10 ppm). The O content in the steel layer may be measured by, for example, the non-dispersive infrared absorption method after fusion in a current of inert gas.

The steel layer of the grain-oriented electrical steel sheet according to the embodiment may further include the optional element in addition to the above explained elements. For example, the steel layer may further include, as the optional element, at least one selected from the group consisting of N, P, Ni, Cr, Cu, and Mo in substitution for a part of Fe which is the balance. The optional elements may be included as necessary. Thus, a lower limit of the respective optional elements does not need to be limited, and the lower limit may be 0%. Moreover, even if the optional elements may be included as impurities, the above mentioned effects are not affected.

N: 0 to 0.01%

N (nitrogen) forms the nitrides which act as the inhibitor. Thus, the content in the steel slab is preferably 0.0010% or more. However, when the large amount of N remains in the steel layer of the grain-oriented electrical steel sheet as final products, the magnetic properties may be negatively influenced. Thus, the upper limit of N content is preferably 0.0100% and more preferably 0.0050%.

P: 0 to 0.15%

P (phosphorus) has the effect in reducing the eddy current loss by increasing the electrical resistance of steel. Thus, the P content may be 0 to 0.15%. The lower limit of P content is preferably 0.0001%.

Ni: 0 to 0.3%

Ni (nickel) has the effect in reducing the eddy current loss by increasing the electrical resistance of steel and in improving the magnetic flux density. Thus, the Ni content may be 0 to 0.3%. The lower limit of Ni content is preferably 0.0001%.

Cr: 0 to 0.3%

Cr (chromium) has the effect in reducing the eddy current loss by increasing the electrical resistance of steel. Thus, the Cr content may be 0 to 0.3%. The lower limit of Cr content is preferably 0.0001%.

Cu: 0 to 0.3%

Cu (copper) has the effect in reducing the eddy current loss by increasing the electrical resistance of steel. Thus, the Cu content may be 0 to 0.3%. The lower limit of Cu content is preferably 0.0001%.

Mo: 0 to 0.3%

Mo (molybdenum) has the effect in reducing the eddy current loss by increasing the electrical resistance of steel. Thus, the Mo content may be 0 to 0.3%. The lower limit of Mo content is preferably 0.0001%.

The chemical composition of the steel layer as described above may be measured by typical analytical methods for the steel. For example, the chemical composition of the steel layer may be measured by using ICP-AES (Inductively Coupled Plasma-Atomic Emission Spectrometer: inductively coupled plasma emission spectroscopy spectrometry). Specifically, granular specimens are taken from center position of the steel layer after removing the coating, chemical analysis is conducted under the conditions based on the predetermined working curve, and thereby, the chemical composition is identified. In addition, C and S may be measured by the infrared absorption method after combustion, N may be measured by the thermal conductometric method after fusion in a current of inert gas, and O may be measured by, for example, the non-dispersive infrared absorption method after fusion in a current of inert gas.

(2) Thickness of Grain-Oriented Electrical Steel Sheet

Next, a preferable thickness of the grain-oriented electrical steel sheet according to the embodiment will be described.

In the grain-oriented electrical steel sheet according to the embodiment, the upper limit of thickness may be 0.40 mm. When the thickness is thicker than 0.40 mm, the eddy current loss may increase and the high-frequency core loss may deteriorate. On the other hand, although the lower limit of thickness is not particularly limited, the lower limit may be 0.1 mm. When the thickness is thinner than 0.1 mm, the productivity is undesirably lowered.

(3) Magnetic Properties of Grain-Oriented Electrical Steel Sheet

Next, preferable magnetic properties of the grain-oriented electrical steel sheet according to the embodiment will be described.

In the grain-oriented electrical steel sheet according to the embodiment, the lower limit of magnetic flux density B8 along the rolling direction (L-direction) is preferably 1.60 T. When the magnetic flux density B8 along the rolling direction is less than 1.60 T, both the L-direction core loss and the L&C average core loss may deteriorate. The lower limit of magnetic flux density B8 along the rolling direction is preferably 1.62 T. On the other hand, the upper limit of magnetic flux density B8 along the rolling direction is preferably 1.77 T. When the magnetic flux density B8 along the rolling direction is more than 1.77 T, the L-direction core loss is sufficient, however the C-direction core loss deteriorates, and as a result, the L&C average core loss drastically deteriorates. The upper limit of magnetic flux density B8 along the rolling direction is preferably 1.76 T.

In addition, in the grain-oriented electrical steel sheet according to the embodiment, the core loss W10/400 along L-direction is preferably 13.0 W/kg or less. Also, the average of the core losses W10/400 along L-direction and C-direction is preferably 14.5 W/kg or less. In the core loss characteristics, since it is preferable that the value thereof is low, the lower limit thereof is not particularly limited. Also, the core loss W10/400 along C-direction is preferably 1.0 to 2.0 times as compared with the core loss W10/400 along L-direction. When the above conditions are satisfied, the average of the high-frequency core losses along L-direction and C-direction is preferably improved.

Herein, the magnetic properties such as the magnetic flux density and the core loss may be measured by a known method, for example, the epstein test regulated by JIS C2550, the single sheet tester (SST) method regulated by JIS C 2556, or the like. Also, the magnetic flux density B8 indicates the magnetic flux density under the magnetizing field of 800 A/m, and the core loss W10/400 indicates the core loss under conditions such that the maximum magnetic flux density is 1.0 T and the frequency is 400 Hz.

Next, a method of producing the grain-oriented electrical steel sheet according to the embodiment will be described in detail.

The method of producing the grain-oriented electrical steel sheet according to the embodiment includes a casting process, a hot-rolling process, a cold-rolling process, a primary recrystallization annealing process, an annealing separator coating process, a secondary recrystallization annealing process, and an insulation coating formation process. As necessary, a hot-band annealing process may be included after the hot-rolling process and before the cold-rolling process. In the cold-rolling process, the cold-rolling may be conducted once or twice or more with intermediate annealing.

Casting Process

In the casting process, a cast piece (slab) is cast so that the cast piece includes, as a chemical composition, by mass %, 0.0003 to 0.005% of C, 2.9 to 4.0% of Si, 2.0 to 4.0% of Mn, 0.003 to 0.018% of sol. Al, 0.001 to 0.01% of N, 0.005% or less of S, 0 to 0.20% of Sn, 0 to 0.20% of Sb, and a balance consisting of Fe and impurities, a silicon content and a manganese content expressed in mass % in the chemical composition satisfy $1.2\% \leq Si-0.5 \times Mn \leq 2.0\%$, and a tin content and an antimony content expressed in mass % in the chemical composition satisfy $0.005\% \leq Sn+Sb \leq 0.20\%$. For example, the slab may be cast by the cast method such as a continuous casting method, an ingot making method, or a thin slab casting method in general. In the case of the continuous casting, the steel may be subjected to the hot-rolling after the steel is cooled once to a lower temperature (for example, room temperature) and is reheated, or the steel (cast slab) may be continuously subjected to the hot-rolling just after the steel is cast.

At least one of Sn or Sb may be included in the above cast piece (slab). However, it is preferable that both Sn and Sb are simultaneously included in the slab. For example, it is preferable that the lower limit of Sn content is 0.004% and the lower limit of Sb content is 0.001%. Specifically, it is preferable that the slab includes Mn, Sn, and Sb at the same time in the casting process of the method of producing the grain-oriented electrical steel sheet according to the embodiment.

Hot-Rolling Process

In the hot-rolling process, the slab after the casting process is heated to 1050 to 1400° C., the hot-rolling is conducted for the above slab, and the hot-rolling is finished in the range of 700 to 950° C. In the hot-rolling process, the hot-rolling may be conducted so as to obtain the hot-rolled steel sheet with the thickness of 1.8 to 3.5 mm.

Hot-Band Annealing Process

After the hot-rolling process, the hot-band annealing may be conducted as necessary. In the hot-band annealing process, for the hot-rolled steel sheet after the hot-rolling process, the annealing may be conducted under conditions in 750 to 1200° C. for 10 seconds to 10 minutes for continuous-annealing, and the annealing may be conducted under conditions in 650 to 950° C. for 30 minutes to 24 hours for box-annealing.

Cold-Rolling Process

In the cold-rolling process, the cold-rolling is conducted for the hot-rolled steel sheet after the hot-rolling process or the hot-band annealed sheet after the hot-band annealing process. In the cold-rolling process, the cold-rolling may be conducted so as to obtain the cold-rolled steel sheet with the thickness of 0.1 to 0.4 mm. In case that the cold-rolling may be conducted twice or more with intermediate annealing, the reduction of cold-rolling before the intermediate annealing may be 40 to 70%, and the reduction of final cold-rolling after the intermediate annealing may be 40 to 90%. The intermediate annealing may be conducted under the same annealing conditions as those of the above hot-band annealing.

Primary Recrystallization Annealing Process

In the primary recrystallization annealing process, the primary recrystallization annealing is conducted for the cold-rolled steel sheet after the cold-rolling process. In the primary recrystallization annealing process, a rapid heating is conducted in a temperature elevating stage. By conducting the rapid heating in the temperature elevating stage of the primary recrystallization annealing process, it is possible to shorten the heating time, and as a result, to suppress the surface oxidation during the temperature elevating stage. In addition, the holding is conducted in dry atmosphere (non-decarburizing atmosphere). Specifically, in the temperature elevating stage, the heating rate in the temperature elevating stage is 100° C./second to 5000° C./second on average, the atmosphere in the temperature elevating stage is 10 to 100 vol % of H2 and H2+N2=100 vol %, and the dew point of the atmosphere in the temperature elevating stage is preferably 0° C. or lower. In a holding stage, the temperature in the holding stage is 800 to 1000° C., the time in the holding stage is 5 seconds to 10 minutes, the atmosphere in the holding stage is 10 to 100 vol % of H2, H2+N2=100 vol %, and the dew point is −10° C. or lower. The heating rate in the temperature elevating stage is preferably 100° C./second to 2000° C./second.

The atmosphere in the temperature elevating stage is preferably less than 50 vol % of H2 and more preferably less than 25 vol % of H2. Also, the atmosphere in the holding stage is preferably less than 50 vol % of H2 and more preferably less than 25 vol % of H2. When the above conditions are satisfied, the average of the high-frequency core losses along L-direction and C-direction is preferably improved.

Annealing Separator Coating Process

In the annealing separator coating process, an annealing separator including alumina (Al2O3) as main component is only applied on the primary-recrystallized steel sheet after the primary recrystallization annealing process. The annealing separator including magnesia (MgO) as main component does not use, the magnesia being changed to hydroxide during coating and thereby resulting in the large amount of O brought in. By using the alumina-based separator, it is possible to suppress the excessive oxidation in the vicinity of the surface of steel layer in the secondary recrystallization annealing process.

Secondary Recrystallization Annealing Process

In the secondary recrystallization annealing process, the secondary recrystallization annealing is conducted for the separator-coated steel sheet after the annealing separator coating process. In the secondary recrystallization annealing process, an atmosphere in a temperature elevating stage is controlled and the holding is conducted in dry atmosphere. Specifically, the atmosphere in the temperature elevating stage is 0 to 80 vol % of N2 and H2+N2=100 vol %, the dew point in the temperature range of 500° C. or higher in the temperature elevating stage is 0° C. or lower, the temperature in the holding stage is 850 to 1000° C., the time in the holding stage is 4 to 100 hours, the atmosphere in the holding stage is 0 to 80 vol % of N2, H2+N2=100 vol %, and the dew point is 0° C. or lower. The atmosphere in the holding stage is preferably 0 to 50 vol % of N2.

In the temperature elevating stage, the steel sheet may be heated to the above temperature of 850 to 1000° C. in the holding stage by the constant heating rate in substance (without the two stage annealing). The heating rate in the temperature of 800° C. or higher is preferably 10 to 50° C./hour on average. The atmosphere in the temperature elevating stage is preferably less than 30 vol % of N2 and more preferably less than 20 vol % of N2. The atmosphere in the holding stage is preferably 100% of H2. When the above conditions are satisfied, the average of the high-frequency core losses along L-direction and C-direction is preferably improved.

Insulation Coating Formation Process

In the insulation coating formation process, the insulation coating is formed for the secondary recrystallized steel sheet after the secondary recrystallization annealing process. For example, the mixture of resin such as acrylic and inorganic material such as phosphate, the solution for insulation coating containing colloidal silica and phosphate, or the like may be applied on the surface of steel sheet, and the heat treatment may be conducted in the temperature range of 250 to 400° C. in case that an organic is contained and the temperature range of 840 to 920° C. in case that an inorganic is only contained.

The grain-oriented electrical steel sheet produced as mentioned above includes a steel layer (base steel) and an insulation coating arranged on the steel layer, wherein: the steel layer includes, as a chemical composition, by mass %, 0.0003 to 0.005% of C, 2.9 to 4.0% of Si, 2.0 to 4.0% of Mn, 0.003 to 0.018% of sol. Al, 0.005% or less of S, 0 to 0.20% of Sn, 0 to 0.20% of Sb, and a balance consisting of Fe and impurities; a silicon content and a manganese content expressed in mass % in the chemical composition of the steel layer satisfy 1.2%≤Si−0.5×Mn≤2.0%; a tin content and an antimony content expressed in mass % in the chemical composition of the steel layer satisfy 0.005%≤Sn+Sb≤0.20%; and the insulation coating is arranged in directly contact with the steel layer.

In the grain-oriented electrical steel sheet produced by optimally and comprehensively controlling the above production conditions, even when the Mn content and the Sn+Sb total content are simultaneously increased in the steel layer, in particular, even when Sn and Sb are included at the same time in addition to increasing the Mn content, it is possible to suppress the excessive oxidation in the vicinity of the surface of steel layer. Thus, it is possible to suppress the decrease in the adhesion of insulation coating. Also, it is possible to preferably improve the average of the high-frequency magnetic properties (core losses) along L-direction and C-direction.

EXAMPLES

Hereinafter, the effects of an aspect of the present invention will be described in detail with reference to the following examples. However, the condition in the examples is an example condition employed to confirm the operability and the effects of the present invention, so that the present invention is not limited to the example condition. The present invention can employ various types of conditions as long as the conditions do not depart from the scope of the present invention and can achieve the object of the present invention.

Example 1

The steel slabs whose chemical compositions were shown in Table 1 with the balance consisting of Fe and impurities were heated to 1250° C. and then were hot-rolled so that the thickness was 2.6 mm. The cold-rolling was conducted so that the thickness was 1.2 mm, the intermediate annealing was conducted at 900° C. for 30 seconds, the final rolling was conducted so that the final thickness was 0.30 mm, the primary recrystallization annealing was conducted at 920° C. for 15 seconds, the annealing separator was applied, the secondary recrystallization annealing was conducted at the maximum temperature of 940° C., and thereafter, the insulation coating was formed.

In the primary recrystallization annealing process, the heating rate in the temperature elevating stage was 400° C./second, the atmosphere in the temperature elevating stage was 20% of H2 and 80% of N2, the atmosphere in the holding stage was 20% of H2 and 80% of N2, and the dew point in the holding stage was −20° C. The alumina-based separator was used for the annealing separator. In the secondary recrystallization annealing process, the heating rate in the temperature elevating stage of 800° C. or higher was 20° C./hour, the temperature was elevated to 940° C. by the constant heating rate in substance, the atmosphere in the temperature elevating stage was 85% of H2 and 15% of N2, the dew point in the temperature range of 500° C. or higher in the temperature elevating stage was −10° C., the time in the holding stage was 10 hours, the atmosphere in the holding stage was 100% of H2, and the dew point in the holding stage was −30° C. In all steel sheets, the insulation coating was arranged in directly contact with the steel layer, and the adhesion was sufficient.

TABLE 1

| STEEL TYPE | C | Si | Mn | S | sol. Al | N | Si − 0.5 × Mn | Sn | Sb | NOTE |
|---|---|---|---|---|---|---|---|---|---|---|
| A | 0.002 | 3.00 | 2.63 | 0.002 | <u>0.002</u> | 0.0038 | 1.69 | Tr. | Tr. | COMPARATIVE EXAMPLE |
| B | 0.002 | 2.99 | 2.62 | 0.002 | 0.009 | 0.0031 | 1.68 | 0.03 | Tr. | EXAMPLE |
| C | 0.002 | 3.00 | 2.63 | 0.002 | <u>0.021</u> | 0.0037 | 1.69 | Tr. | Tr. | COMPARATIVE EXAMPLE |
| D | 0.002 | 3.00 | 2.65 | 0.002 | 0.007 | 0.0044 | 1.68 | 0.05 | Tr. | EXAMPLE |
| E | 0.002 | 3.12 | 3.23 | 0.002 | 0.016 | 0.0040 | 1.51 | Tr. | 0.06 | EXAMPLE |
| F | 0.003 | 3.20 | 3.30 | 0.002 | 0.014 | 0.0036 | 1.55 | 0.12 | Tr. | EXAMPLE |
| G | 0.003 | 2.99 | 2.62 | 0.002 | <u>0.020</u> | 0.0034 | 1.68 | 0.05 | Tr. | COMPARATIVE EXAMPLE |

※The underlined value indicates out of the range of the present invention.

The specimens with a square 55 mm on a side were punched, the stress relief annealing was conducted at 750° C. for 2 hours, and then, the magnetic properties (magnetic flux density B8 and core loss W10/400) along L-direction and C-direction were evaluated by the single sheet tester (SST) method. The steel sheet in which the magnetic flux density B8 along L-direction was 1.60 to 1.77 T was judged to be acceptable, the steel sheet in which the core loss W10/400 along L-direction was 13.0 W/kg or less was judged to be acceptable, and the steel sheet in which the average of the core losses W10/400 along L-direction and C-direction was 14.5 W/kg or less was judged to be acceptable. Also, for the comparison with the conventional grain-oriented electrical steel sheet, the magnetic properties of commercial steel sheet of JIS standard 30P105 grade were evaluated as well.

The results are shown in the Table 2.

TABLE 2

| | | CHEMICAL COMPOSITION OF STEEL SLAB (mass %) | | | | | | | | B8 (T) | W10/400 (W/kg) | | | |
|---|---|---|---|---|---|---|---|---|---|---|---|---|---|---|
| No. | STEEL TYPE | C | Si | Mn | S | sol. Al | Si − 0.5 × Mn | Sn | Sb | L-DIRECTION | L-DIRECTION | C-DIRECTION | L&C AVERAGE | NOTE |
| 1 | A | 0.001 | 3.00 | 2.63 | 0.002 | <u>0.001</u> | 1.69 | Tr. | Tr. | 1.52 | 14.0 | 15.5 | 14.8 | COMPARATIVE EXAMPLE |
| 2 | B | 0.002 | 2.99 | 2.62 | 0.002 | 0.007 | 1.68 | 0.03 | Tr. | 1.70 | 10.4 | 16.0 | 13.2 | EXAMPLE |

TABLE 2-continued

| | | CHEMICAL COMPOSITION OF STEEL SLAB (mass %) | | | | | | | | B8 (T) | W10/400 (W/kg) | | | |
|---|---|---|---|---|---|---|---|---|---|---|---|---|---|---|
| No. | STEEL TYPE | C | Si | Mn | S | sol. Al | Si − 0.5 × Mn | Sn | Sb | L-DIRECTION | L-DIRECTION | C-DIRECTION | L&C AVERAGE | NOTE |
| 3 | C | 0.002 | 3.00 | 2.63 | 0.002 | <u>0.020</u> | 1.69 | Tr. | Tr. | 1.48 | 17.1 | 17.8 | 17.5 | COMPARATIVE EXAMPLE |
| 4 | D | 0.001 | 3.00 | 2.65 | 0.002 | 0.005 | 1.68 | 0.05 | Tr. | 1.70 | 9.5 | 15.9 | 12.7 | EXAMPLE |
| 5 | E | 0.001 | 3.12 | 3.23 | 0.002 | 0.016 | 1.51 | Tr. | 0.06 | 1.68 | 9.3 | 15.6 | 12.5 | EXAMPLE |
| 6 | F | 0.002 | 3.20 | 3.30 | 0.002 | 0.013 | 1.55 | 0.12 | Tr. | 1.68 | 9.2 | 15.5 | 12.4 | EXAMPLE |
| 7 | G | 0.002 | 2.99 | 2.62 | 0.002 | <u>0.019</u> | 1.68 | 0.05 | Tr. | 1.54 | 13.8 | 15.5 | 14.7 | COMPARATIVE EXAMPLE |
| 8 | 30P105 | Tr. | 3.00 | Tr. | Tr. | Tr. | ≈3.00 | Tr. | Tr. | 1.93 | 10.1 | 28.2 | 19.2 | COMPARATIVE EXAMPLE |

※The underlined value indicates out of the range of the present invention.

As shown in Table 2, in the examples of the steel types B, D, E, and F (No.2, 4, 5, and 6) which were the materials including sol. Al, since the secondary recrystallization occurred in the entire surface of specimen, the L-direction core loss W10/400 and the L&C average core loss W10/400 were acceptable. On the other hand, in the steel type A (No.1) where the sol. Al content was less than the lower limit and the steel types C and G (No.3 and 7) where the sol. Al content was more than the upper limit, since the secondary recrystallization did not occur sufficiently, the magnetic flux density B8 was insufficient, and the L-direction core loss W10/400 and the L&C average core loss W10/400 were insufficient.

In addition, in comparison between the core loss W10/400 of the examples of the steel types B, D, E, and F in (No.2, 4, 5, and 6) and the core loss W10/400 of the commercial steel sheet (No.8) of JIS standard 30P105 grade, although the L-direction core losses thereof were substantially the same, the L&C average core losses of the examples were significantly improved.

Example 2

The steel slabs whose chemical compositions were shown in Table 3 with the balance consisting of Fe and impurities were heated to 1200° C. and then were hot-rolled so that the thickness was 2.1 mm. The hot-band annealing was conducted at 900° C. for 30 seconds, the cold-rolling was conducted so that the final thickness was 0.35 mm, the primary recrystallization annealing was conducted at 920° C. for 15 seconds, the annealing separator was applied, the secondary recrystallization annealing was conducted at the maximum temperature of 940° C., and thereafter, the insulation coating was formed. In addition, in order to evaluate the effect of the thickness of product, the steel sheet where the cold-rolling was conducted so that the final thickness was 0.50 mm was produced, wherein the production conditions except for the final thickness were the same.

In the primary recrystallization annealing process, the heating rate in the temperature elevating stage was 200° C./second, the atmosphere in the temperature elevating stage was 25% of H2 and 75% of N2, the atmosphere in the holding stage was 25% of H2 and 75% of N2, and the dew point in the holding stage was −20° C. The alumina-based separator was used for the annealing separator. In the secondary recrystallization annealing process, the heating rate in the temperature elevating stage of 800° C. or higher was 15° C./hour, the temperature was elevated to 940° C. by the constant heating rate in substance, the atmosphere in the temperature elevating stage was 90% of H2 and 10% of N2, the dew point in the temperature range of 500° C. or higher in the temperature elevating stage was −30° C., the time in the holding stage was 10 hours, the atmosphere in the holding stage was 100% of H2, and the dew point in the holding stage was −40° C. In all steel sheets, the insulation coating was arranged in directly contact with the steel layer, and the adhesion was sufficient.

TABLE 3

| | CHEMICAL COMPOSITION OF STEEL SLAB (mass %) | | | | | | | | | |
|---|---|---|---|---|---|---|---|---|---|---|
| STEEL TYPE | C | Si | Mn | S | sol. Al | N | Si − 0.5 × Mn | Sn | Sb | NOTE |
| H | 0.003 | 3.03 | 2.80 | 0.003 | 0.013 | 0.0047 | 1.63 | 0.05 | Tr. | EXAMPLE |
| I | 0.003 | 3.05 | 2.80 | 0.003 | 0.012 | 0.0045 | 1.65 | 0.08 | Tr. | EXAMPLE |
| J | 0.003 | 3.10 | 2.82 | 0.002 | 0.011 | 0.0048 | 1.69 | Tr. | 0.05 | EXAMPLE |
| K | 0.002 | 3.40 | 3.03 | 0.002 | 0.015 | 0.0050 | 1.89 | 0.06 | Tr. | EXAMPLE |
| L | 0.002 | 3.38 | 2.58 | 0.002 | 0.015 | 0.0053 | <u>2.09</u> | 0.05 | Tr. | COMPARATIVE EXAMPLE |
| M | 0.003 | 3.06 | <u>1.47</u> | 0.003 | 0.011 | 0.0045 | <u>2.33</u> | 0.05 | Tr. | COMPARATIVE EXAMPLE |

※The underlined value indicates out of the range of the present invention.

The specimens with a square 55 mm on a side were punched, the stress relief annealing was conducted at 750° C. for 2 hours, and then, the magnetic properties (magnetic flux density B8 and core loss W10/400) along L-direction and C-direction were evaluated by the single sheet tester (SST) method. The steel sheet in which the magnetic flux density B8 along L-direction was 1.60 to 1.77 T was judged to be acceptable, the steel sheet in which the core loss W10/400 along L-direction was 13.0 W/kg or less was judged to be acceptable, and the steel sheet in which the average of the core losses W10/400 along L-direction and C-direction was 14.5W/kg or less was judged to be acceptable. The results are shown in the Table 4.

In the primary recrystallization annealing process, the heating rate in the temperature elevating stage was 1000° C./second, the atmosphere in the temperature elevating stage was 15% of H2 and 85% of N2, the atmosphere in the holding stage was 15% of H2 and 85% of N2, and the dew

TABLE 4

| | | CHEMICAL COMPOSITION OF STEEL SLAB (mass %) | | | | | | | | | B8 (T) | W10/400 (W/kg) | | | |
|---|---|---|---|---|---|---|---|---|---|---|---|---|---|---|---|
| No. | STEEL TYPE | C | Si | Mn | S | sol. Al | Si − 0.5 × Mn | Sn | Sb | THICKNESS (mm) | L-DIREC-TION | L-DIREC-TION | C-DIREC-TION | L&C AVER-AGE | NOTE |
| 9 | H | 0.002 | 3.03 | 2.80 | 0.003 | 0.012 | 1.63 | 0.05 | Tr. | 0.35 | 1.69 | 12.0 | 16.6 | 14.3 | EXAMPLE |
| 10 | I | 0.002 | 3.05 | 2.80 | 0.003 | 0.011 | 1.65 | 0.08 | Tr. | 0.35 | 1.71 | 10.9 | 16.9 | 13.9 | EXAMPLE |
| 11 | I | 0.002 | 3.05 | 2.80 | 0.003 | 0.011 | 1.65 | 0.08 | Tr. | 0.50 | 1.72 | 16.9 | 25.0 | 21.0 | REFERENCE EXAMPLE |
| 12 | J | 0.002 | 3.10 | 2.82 | 0.002 | 0.010 | 1.69 | Tr. | 0.05 | 0.35 | 1.70 | 11.0 | 16.9 | 14.0 | EXAMPLE |
| 13 | K | 0.002 | 3.40 | 3.03 | 0.002 | 0.015 | 1.89 | 0.06 | Tr. | 0.35 | 1.69 | 10.5 | 16.5 | 13.5 | EXAMPLE |
| 14 | L | 0.002 | 3.38 | 2.58 | 0.002 | 0.015 | 2.09 | 0.05 | Tr. | 0.35 | 1.57 | 14.1 | 17.2 | 15.7 | COMPARATIVE EXAMPLE |
| 15 | M | 0.002 | 3.06 | 1.47 | 0.003 | 0.010 | 2.33 | 0.05 | Tr. | 0.35 | 1.59 | 13.9 | 17.4 | 15.7 | COMPARATIVE EXAMPLE |

※The underlined value indicates out of the range of the present invention.

As shown in Table 4, in the examples of the steel types H, I, J, and K (No. 9, 10, 12, and 13) which were the materials with the thickness of 0.35 mm, since the secondary recrystallization occurred in the entire surface of specimen, the L-direction core loss W10/400 and the L&C average core loss W10/400 were acceptable. On the other hand, in the steel type I (No.11) where the thickness was 0.5 mm and was thicker than the upper limit, the L-direction core loss W10/400 and the L&C average core loss W10/400 were significantly insufficient. Also, in the steel types L and M (No. 14 and 15) where the value of "Si−0.5×Mn" was more than the upper limit, snice the linear defect of the secondary recrystallization occurred in many areas, the magnetic flux density B8 was insufficient, and the L-direction core loss W10/400 and the L&C average core loss W10/400 were insufficient.

point in the holding stage was −30° C. The alumina-based separator was used for the annealing separator. In the secondary recrystallization annealing process, the heating rate in the temperature elevating stage of 800° C. or higher was 20° C./hour, the temperature was elevated to 940° C. by the constant heating rate in substance, the atmosphere in the temperature elevating stage was 95% of H2 and 5% of N2, the dew point in the temperature range of 500° C. or higher in the temperature elevating stage was −20° C., the time in the holding stage was 15 hours, the atmosphere in the holding stage was 100% of H2, and the dew point in the holding stage was −40° C. In all steel sheets, the insulation coating was arranged in directly contact with the steel layer, and the adhesion was sufficient.

TABLE 5

| | CHEMICAL COMPOSITION OF STEEL SLAB (mass %) | | | | | | | | | |
|---|---|---|---|---|---|---|---|---|---|---|
| STEEL TYPE | C | Si | Mn | S | sol. Al | N | Si − 0.5 × Mn | Sn | Sb | NOTE |
| N | 0.002 | 2.99 | 2.72 | 0.001 | 0.014 | 0.0052 | 1.63 | 0.05 | Tr. | EXAMPLE |
| O | 0.002 | 3.00 | 2.73 | 0.001 | 0.015 | 0.0051 | 1.64 | 0.10 | Tr. | EXAMPLE |
| P | 0.003 | 3.05 | 2.68 | 0.001 | 0.013 | 0.0051 | 1.71 | 0.03 | 0.03 | EXAMPLE |

※The underlined value indicates out of ths range of the present invention.

Example 3

The steel slabs whose chemical compositions were shown in Table 5 with the balance consisting of Fe and impurities were heated to 1250° C. and then were hot-rolled so that the thickness was 2.8 mm. The first cold-rolling was conducted so that the thickness was 1.4 mm, the intermediate annealing was conducted at 950° C. for 30 seconds, the second cold-rolling was conducted so that the final thickness was 0.23 mm, the primary recrystallization annealing was conducted at 920° C. for 15 seconds, the annealing separator was applied, the secondary recrystallization annealing was conducted at the maximum temperature of 940° C., and thereafter, the insulation coating was formed.

The specimens with a square 55 mm on a side were punched, the stress relief annealing was conducted at 750° C. for 2 hours, and then, the magnetic properties (magnetic flux density B8 and core loss W10/400) along L-direction and C-direction were evaluated by the single sheet tester (SST) method. The steel sheet in which the magnetic flux density B8 along L-direction was 1.60 to 1.77 T was judged to be acceptable, the steel sheet in which the core loss W10/400 along L-direction was 13.0 W/kg or less was judged to be acceptable, and the steel sheet in which the average of the core losses W10/400 along L-direction and C-direction was 14.5 W/kg or less was judged to be acceptable. Also, for the comparison with the conventional grain-oriented electrical steel sheet, the magnetic properties of commercial steel sheet of JIS standard 23P95 grade were evaluated as well.

The results are shown in the Table 6.

TABLE 6

| | | CHEMICAL COMPOSITION OF STEEL SLAB (mass %) | | | | | | | | B8 (T) | W10/400 (W/kg) | | | |
|---|---|---|---|---|---|---|---|---|---|---|---|---|---|---|
| No. | STEEL TYPE | C | Si | Mn | S | sol. Al | Si – 0.5 × Mn | Sn | Sb | L-DIREC-TION | L-DIREC-TION | C-DIREC-TION | L&C AVER-AGE | NOTE |
| 16 | N | 0.002 | 2.99 | 2.72 | 0.001 | 0.012 | 1.63 | 0.05 | Tr. | 1.63 | 8.7 | 13.0 | 10.9 | EXAMPLE |
| 17 | O | 0.002 | 3.00 | 2.73 | 0.001 | 0.013 | 1.64 | 0.10 | Tr. | 1.73 | 7.0 | 13.5 | 10.3 | EXAMPLE |
| 18 | P | 0.003 | 3.05 | 2.68 | 0.001 | 0.012 | 1.71 | 0.03 | 0.03 | 1.72 | 7.1 | 13.4 | 10.3 | EXAMPLE |
| 19 | 23P95 | Tr. | 3.00 | Tr. | Tr. | Tr. | ≈3.00 | Tr. | Tr. | 1.92 | 7.4 | 25.1 | 16.3 | COMPARATIVE EXAMPLE |

※The underlined value indicates out of the range of the present invention.

As shown in Table 6, in the examples of the steel types N, O, and P (No.16, 17, and 18), since the secondary recrystallization occurred, the L-direction core loss W10/400 and the L&C average core loss W10/400 were acceptable. Also, in comparison between the core loss W10/400 of the examples of the steel types N, O, and P (No.16, 17, and 18) and the core loss W10/400 of the commercial steel sheet (No.19) of JIS standard 23P95 grade, although the L-direction core losses thereof were substantially the same, the L&C average core losses of the examples were significantly improved.

Example 4

The steel slabs whose chemical compositions were shown in Table 7 with the balance consisting of Fe and impurities were heated to 1230° C. and then were hot-rolled so that the thickness was 2.0 mm. The hot-band annealing was conducted at 920° C. for 30 seconds, the cold-rolling was conducted so that the final thickness was 0.30 mm, the primary recrystallization annealing was conducted at 930° C. for 15 seconds, the annealing separator was applied, the secondary recrystallization annealing was conducted at the maximum temperature of 940° C., and thereafter, the insulation coating was formed.

In the primary recrystallization annealing process, the heating rate in the temperature elevating stage was 120° C./second, the atmosphere in the temperature elevating stage was 20% of H2 and 80% of N2, the atmosphere in the holding stage was 20% of H2 and 80% of N2, and the dew points in the holding stage were under conditions of −25° C., −10° C., 0° C., and 30° C. The alumina-based separator was used for the annealing separator.

In the secondary recrystallization annealing process, the heating rate in the temperature elevating stage of 800° C. or higher was 20° C./hour, the temperature was elevated to 940° C. by the constant heating rate in substance, the atmosphere in the temperature elevating stage was 85% of H2 and 15% of N2, the dew point in the temperature range of 500° C. or higher in the temperature elevating stage was 0° C., the time in the holding stage was 5 hours, the atmosphere in the holding stage was 100% of H2, and the dew point in the holding stage was −30° C. In the steel sheets of test Nos. 20 and 21, the insulation coating was arranged in directly contact with the steel layer, and the adhesion was sufficient. On the other hand, in the steel sheets of test Nos. 22 and 23, the oxide was formed between the insulation coating and the steel layer, and the adhesion was insufficient.

TABLE 7

| | CHEMICAL COMPOSITION OF STEEL SLAB (mass %) | | | | | | | | | |
|---|---|---|---|---|---|---|---|---|---|---|
| STEEL TYPE | C | Si | Mn | S | sol. Al | N | Si – 0.5 × Mn | Sn | Sb | NOTE |
| Q | 0.003 | 3.10 | 2.81 | 0.001 | 0.007 | 0.0042 | 1.70 | 0.030 | Tr. | EXAMPLE |
| R | 0.003 | 3.00 | 2.84 | 0.003 | 0.015 | 0.0049 | 1.58 | 0.003 | 0.0008 | COMPARATIVE EXAMPLE |
| S | 0.003 | 2.98 | 1.97 | 0.003 | 0.014 | 0.0049 | 2.00 | 0.050 | 0.050 | COMPARATIVE EXAMPLE |
| T | 0.003 | 3.25 | 4.10 | 0.003 | 0.015 | 0.0049 | 1.20 | 0.050 | 0.050 | COMPARATIVE EXAMPLE |

※The underlined value indicates out of the range of the present invention.

The specimens with a square 55 mm on a side were punched, the stress relief annealing was conducted at 750° C. for 2 hours, and then, the magnetic properties (magnetic flux density B8 and core loss W10/400) along L-direction and C-direction were evaluated by the single sheet tester (SST) method. The steel sheet in which the magnetic flux density B8 along L-direction was 1.60 to 1.77 T was judged to be acceptable, the steel sheet in which the core loss W10/400 along L-direction was 13.0 W/kg or less was judged to be acceptable, and the steel sheet in which the average of the core losses W10/400 along L-direction and C-direction was 14.5 W/kg or less was judged to be acceptable. The results are shown in the Table 8.

TABLE 8

| No. | STEEL TYPE | DEW POINT IN HOLDING STAGE FOR PRIMARY RECRYS- TALLIZA- TION | CHEMICAL COMPOSITION OF STEEL SLAB (mass %) | | | | | Si − 0.5 × Mn | Sn | Sb | B8 (T) L- DIREC- TION | W10/400 (W/kg) | | | NOTE |
|---|---|---|---|---|---|---|---|---|---|---|---|---|---|---|---|
| | | | C | Si | Mn | S | sol. Al | | | | | L- DIREC- TION | C- DIREC- TION | L&C AVER- AGE | |
| 20 | Q | −25° C. | 0.002 | 3.10 | 2.81 | 0.001 | 0.006 | 1.70 | 0.03 | Tr. | 1.71 | 9.5 | 15.7 | 12.6 | EXAMPLE |
| 21 | Q | −10° C. | 0.002 | 3.10 | 2.81 | 0.001 | 0.005 | 1.70 | 0.03 | Tr. | 1.70 | 9.8 | 15.6 | 12.7 | EXAMPLE |
| 22 | Q | 0° C. | — | — | — | — | — | — | — | — | — | — | — | — | COMPARATIVE EXAMPLE |
| 23 | Q | 30° C. | — | — | — | — | — | — | — | — | — | — | — | — | COMPARATIVE EXAMPLE |
| 24 | R | −25° C. | 0.002 | 3.00 | 2.84 | 0.003 | 0.014 | 1.58 | 0.003 | 0.0008 | 1.69 | 13.1 | 16.0 | 14.6 | COMPARATIVE EXAMPLE |
| 25 | S | −25° C. | 0.003 | 2.98 | <u>1.97</u> | 0.003 | 0.013 | 2.00 | 0.050 | 0.050 | 1.68 | 13.2 | 15.9 | 14.6 | COMPARATIVE EXAMPLE |
| 26 | T | −25° C. | 0.003 | 3.25 | <u>4.10</u> | 0.003 | 0.014 | 1.20 | 0.050 | 0.050 | 1.57 | 14.1 | 17.2 | 15.7 | COMPARATIVE EXAMPLE |

※The underlined value indicates out of the range of the present invention.

As shown in Table 8, in the examples of test Nos. 20 and 21, since the secondary recrystallization occurred in the entire surface of specimen, the L-direction core loss W10/400 and the L&C average core loss W10/400 were acceptable. Also, in the examples of test Nos. 20 and 21, the O content of the steel layer was 0.03% (300 ppm) or less measured by the non-dispersive infrared absorption method after fusion in a current of inert gas.

On the other hand, in the comparative examples of test Nos. 22 and 23, the O content of the steel layer was more than 0.03% (300 ppm), the thick oxide layer was formed on the surface of steel layer, the adhesion of the insulation coating significantly deteriorated, and thus, the magnetic properties could not be evaluated. Also, in the comparative examples of the steel types R, S, and T (No. 24 to 26), the magnetic flux density B8 and the core loss W10/400 were insufficient.

INDUSTRIAL APPLICABILITY

According to the above aspects of the present invention, it is possible to provide the grain-oriented electrical steel sheet excellent in both the high-frequency magnetic properties in L-direction and the average of high-frequency magnetic properties in L-direction and C-direction. Accordingly, the present invention has significant industrial applicability.

REFERENCE SIGNS LIST

1: STEEL LAYER (BASE STEEL)
2: INSULATION COATING
3: GLASS FILM (FORSTERITE FILM)

The invention claimed is:
1. A method of producing a grain-oriented electrical steel sheet,
the method consisting of a casting process, a hot-rolling process, a cold-rolling process, a primary recrystallization annealing process, an annealing separator coating process, a secondary recrystallization annealing process, and an insulation coating formation process, wherein:

in the casting process, a steel is cast so that the steel includes, as a chemical composition, by mass %,
0.0003 to 0.005% of C,
2.9 to 4.0% of Si,
2.0 to 4.0% of Mn,
0.003 to 0.018% of sol. Al,
0.001 to 0.01% of N,
0.005% or less of S,
0 to 0.20% of Sn,
0 to 0.20% of Sb, and
a balance consisting of Fe and impurities,
a silicon content and a manganese content expressed in mass % in the chemical composition satisfy 1.2% <Si − 0.5 × Mn <2.0%, and
a tin content and an antimony content expressed in mass % in the chemical composition satisfy 0.005%≤Sn+ Sb≤0.20%;
in the primary recrystallization annealing process, a primary recrystallization annealing is conducted for the steel under conditions such that a heating rate in a temperature elevating stage is 100° C./second to 5000° C./second on average, an atmosphere in the temperature elevating stage is 10 to 100 vol % of H2 and H2+N2=100 vol %, a temperature in a holding stage is 800 to 1000° C., a time in the holding stage is 5 seconds to 10 minutes, an atmosphere in the holding stage is 10 to 100 vol % of H2, H2+N2=100 vol %, and a dew point is −10° C. or lower;
in the annealing separator coating process, an annealing separator including an alumina as a main component is only applied on the steel; and
in the secondary recrystallization annealing process, a secondary recrystallization annealing is conducted for the steel under conditions such that an atmosphere in a temperature elevating stage is 0 to 80 vol % of N2 and H2+N2=100 vol %, a dew point in a temperature range of 500° C. or higher in the temperature elevating stage is 0° C. or lower, a temperature in a holding stage is 850 to 1000° C., a time in the holding stage is 4 to 100 hours, an atmosphere in the holding stage is 0 to 80 vol % of N2, H2+N2=100 vol %, and a dew point is 0° C. or lower; and in the insulation coating formation process an insulation coating is formed on the steel after the secondary recrystallization annealing process.

2. The method of producing a grain-oriented electrical steel sheet according to claim 1, wherein,
in the casting process, the steel includes, as the chemical composition, by mass %,
0.004 to 0.20% of Sn, and
0.001 to 0.20% of Sb.

3. The method of producing a grain-oriented electrical steel sheet according to claim 1, wherein,
in the secondary recrystallization annealing process, the steel is heated to the temperature in the holding stage by a constant heating rate in the temperature elevating stage.

4. The method of producing a grain-oriented electrical steel sheet according to claim 2, wherein,
in the secondary recrystallization annealing process, the steel is heated to the temperature in the holding stage by a constant heating rate in the temperature elevating stage.

5. A method of producing a grain-oriented electrical steel sheet,
the method consisting of a casting process, a hot-rolling process, a cold-rolling process, a primary recrystallization annealing process, an annealing separator coating process, a secondary recrystallization annealing process, and an insulation coating formation process, wherein:
in the casting process, a steel is cast so that the steel includes, as a chemical composition, by mass %,
0.0003 to 0.005% of C,
2.9 to 4.0% of Si,
2.0 to 4.0% of Mn,
0.003 to 0.018% of sol. Al,
0.001 to 0.01% of N,
0.005% or less of S,
0 to 0.20% of Sn,
0 to 0.20% of Sb, and
a balance including Fe and impurities,
a silicon content and a manganese content expressed in mass % in the chemical composition satisfy 1.2%≤Si−0.5×Mn≤2.0%, and
a tin content and an antimony content expressed in mass % in the chemical composition satisfy 0.005%≤Sn+Sb≤0.20%;
in the primary recrystallization annealing process, a primary recrystallization annealing is conducted for the steel under conditions such that a heating rate in a temperature elevating stage is 100° C./second to 5000° C./second on average, an atmosphere in the temperature elevating stage is 10 to 100 vol % of H2 and H2+N2=100 vol %, a temperature in a holding stage is 800 to 1000° C., a time in the holding stage is 5 seconds to 10 minutes, an atmosphere in the holding stage is 10 to 100 vol % of H2, H2+N2=100 vol %, and a dew point is −10° C. or lower;
in the annealing separator coating process, an annealing separator including an alumina as a main component is only applied on the steel; and
in the secondary recrystallization annealing process, a secondary recrystallization annealing is conducted for the steel under conditions such that an atmosphere in a temperature elevating stage is 0 to 80 vol % of N2 and H2+N2=100 vol %, a dew point in a temperature range of 500° C. or higher in the temperature elevating stage is 0° C. or lower, a temperature in a holding stage is 850 to 1000° C., a time in the holding stage is 4 to 100 hours, an atmosphere in the holding stage is 0 to 80 vol % of N2, H2+N2=100 vol %, and a dew point is 0° C. or lower; and
in the insulation coating formation process an insulation coating is formed on the steel after the secondary recrystallization annealing process.

* * * * *